(12) United States Patent
O'Hara (10) Patent No.: US 12,095,811 B2
(45) Date of Patent: Sep. 17, 2024

(54) BRIDGING BETWEEN CLIENT AND SERVER DEVICES USING PROXIED NETWORK METRICS

(71) Applicant: Arbor Networks, Inc., Westford, MA (US)

(72) Inventor: Sean O'Hara, Saline, MI (US)

(73) Assignee: ARBOR NETWORKS, INC., Westford, MA (US)

( * ) Notice: Subject to any disclaimer, the term of this patent is extended or adjusted under 35 U.S.C. 154(b) by 421 days.

(21) Appl. No.: 17/538,732

(22) Filed: Nov. 30, 2021

(65) Prior Publication Data

US 2023/0171286 A1    Jun. 1, 2023

(51) Int. Cl.
*H04L 9/40* (2022.01)
*H04L 12/46* (2006.01)

(52) U.S. Cl.
CPC ...... *H04L 63/1458* (2013.01); *H04L 12/4633* (2013.01); *H04L 63/0281* (2013.01); *H04L 63/1425* (2013.01); *H04L 63/166* (2013.01)

(58) Field of Classification Search
CPC ............. H04L 63/1458; H04L 12/4633; H04L 63/0281; H04L 63/1425; H04L 63/166
See application file for complete search history.

(56) References Cited

U.S. PATENT DOCUMENTS

| 11,182,496 B1 * | 11/2021 | Walters | G06F 21/85 |
| 2009/0029672 A1 * | 1/2009 | Manz | G08B 27/005 |
| | | | 455/404.2 |

(Continued)

*Primary Examiner* — Raqiul A Choudhury
(74) *Attorney, Agent, or Firm* — Foley & Lardner LLP (57) ABSTRACT

A system and method for providing network bridge upstream connections by a network device using proxied network metrics. An upstream network bridge connection request is received in a network device (e.g., a bridge device) from first network component (e.g., a client device) for connecting to a second network component (e.g., a network server device). This upstream network bridge connection request is analyzed by the network bridge to determine if a network attack threat is associated with the client device requesting the upstream network bridge connection to the server device preferably by inspecting certain network metrics present in the downstream connection associated with the client device. If no network attack threat is determined, then a determination is made as to whether a preexisting upstream network bridge connection between the client device and the server device exists in a connection pool database. If yes, then the preexisting upstream network bridge connection is retrieved from the connection pool database and is implemented for creating an upstream network connection between the client and server devices. If there is no preexisting upstream connection, then a new upstream network bridge connection is generated and implemented creating an upstream network connection between the client and server devices. And if the network bridge device determines a network attack threat was associated with the client device requesting the upstream network bridge connection request, then a new upstream network connection is created for coupling the client and server devices, which newly created upstream network connection is separate/segregated from any upstream connections preexisting in the connection pool database.

20 Claims, 5 Drawing Sheets

(56) References Cited

U.S. PATENT DOCUMENTS

2010/0058455 A1* 3/2010 Irudayaraj ............... H04L 63/20
                                                        726/11
2017/0214701 A1* 7/2017 Hasan ................. H04L 63/1491
2018/0109495 A1* 4/2018 Vasseur ............... H04L 63/0245
2020/0045016 A1* 2/2020 Chor ................... H04L 63/0442

* cited by examiner

BRIDGING BETWEEN CLIENT AND SERVER DEVICES USING PROXIED NETWORK METRICS

FIELD OF THE INVENTION

The disclosed embodiments generally relate to data communication networks. In particular, the disclosed embodiments relate to systems and methods for implementing network bridge connections using proxied network metrics.

BACKGROUND OF THE INVENTION

Computer networks, bridges and proxies are often utilized to inspect and/or analyze traffic by upstream services non-trivial by masking the originating host. For instance, two examples include the identification of original source IP address of a client device for load-balancing and fingerprinting of network traffic received therefrom for network security purposes (e.g., mitigating network attacks, such as Distributed Denial of Services (DDoS)). It is to be appreciated that network headers in traffic received from an upstream connection from a client device typically includes TCP Option 28, HTTP X-Forwarded-For (XFF), and SMTP X-Originating-IP, which may be utilized by a network appliance (e.g., a load balancer) to determine the originating source location of a client device, as well as being modified to expose fingerprints of the client device. With regard to sending messages to a server device, a common method is by sending the client IP address in the TCP option of the first data packet. A receiving network appliance (a network bridge device) uses the TCP option number in the TCP profile, if the server using TCP option to read the client IP address. The IP address is carried in the TCP option number 28 (configurable on the appliance service). The TCP option method includes both insert and forward functionality in carrying the client IP address to a server device. In the TCP option configuration, the appliance adds a TCP option, 28 to insert the client IP address and forward it to the back-end server. And with regard to utilizing XFF, it is to be appreciated the XFF header is a standard header for identifying the originating IP address of a client connecting to a web server through an HTTP proxy or a load balancer. When traffic is intercepted between clients and servers, server access logs contain the IP address of the proxy or load balancer only. To see the original IP address of the client, the X-Forwarded-For (XFF) request header is often used, which is often used for debugging, statistics, and generating location-dependent content and by design it exposes privacy sensitive information, such as the IP address of the client.

However, it is to be understood TCP Option 28 is limited to identifying a single IP address, which leads to complexities for determining a client device location if a next hop overwrites it or does not forward it correctly. However, with regards to XFR, it does not share this limitation of TCP Option 28, but it may be rendered useless by encrypted traffic without performing complex decryption operations (assuming decryption is even possible). Thus, neither TCP Option 28 nor XFR allow for multiple sources per packet, adding to network congestion. An additional drawback associated with both TCP Option 28 and XFR is that each is susceptible to spoofing at varying degrees and thus requires distinct implementations and additional processing for upstream services to take advantage of them.

Thus, known network bridges and proxies regularly reuse connections and pipeline requests, but none are known to pool upstream connections based on the approximation of downstream connection and security metrics.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system and method for providing network bridge connections by a network device using proxied network metrics is described in which an downstream connection is received in a network device (e.g., a bridge device) from first network component (e.g., a network) client device seeking an upstream network bridge connection to a second network component (e.g., a network server device). This upstream network bridge connection request is analyzed by the network bridge device to determine if a network attack threat is associated with the client device requesting the upstream network bridge connection by inspecting certain network metrics present in the downstream connection associated with the requesting client device.

If no network attack threat is determined, then a determination is made as to whether a preexisting upstream network bridge connection between the network bridge device and the requested server exists in a connection pool database. If yes, then the preexisting upstream network bridge connection is retrieved from the connection pool database and is then implemented for creating an upstream network connection between the client and server devices. If there is no preexisting upstream connection in the connection pool database for network coupling the client and server devices, then a new upstream network bridge connection is created and implemented creating an upstream network connection between the client and server devices. The connection metrics for both the aforesaid preexisting and newly created upstream connections are preferably updated and stored in the connection pool database for subsequent retrieval.

And if the network bridge device determines a network attack threat is associated with the client device requesting the upstream network bridge connection request, then a new upstream network connection is created for coupling the client and server devices, which newly created upstream network connection is separate/segregated from any implemented and/or upstream connections preexisting in the connection pool database for network coupling the client and server devices.

BRIEF DESCRIPTION OF THE DRAWINGS

The accompanying appendices and/or drawings illustrate various non-limiting, exemplary, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Figure 1:
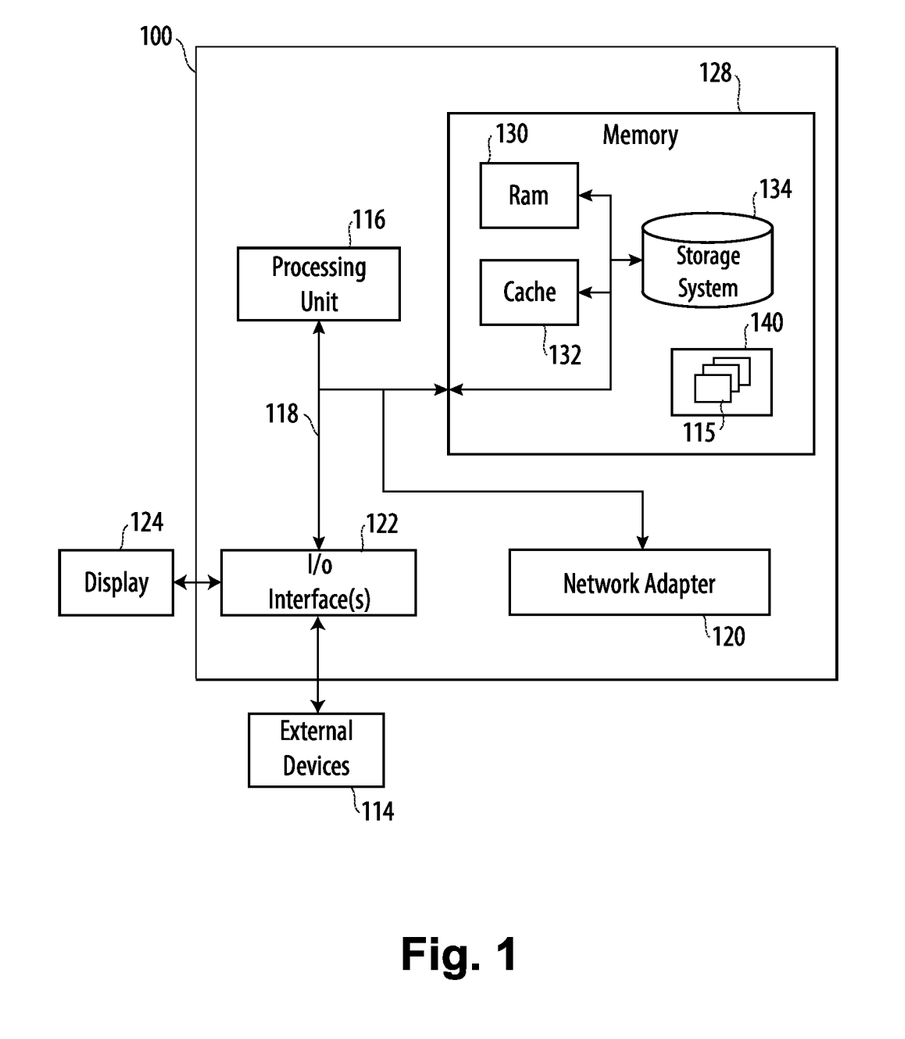
FIG. 1 illustrates an exemplary network device/node.

Turning now descriptively to the drawings, in which similar reference characters denote similar elements throughout the several views, FIG. 1 depicts an exemplary schematic block diagram of an example network computing device 100 that may be used (or components thereof) with one or more embodiments described herein (e.g., client devices, server devices, network bridge devices, and load balancing devices). As explained above, in different embodiments these various devices are configured to communicate with each other in any suitable way, such as, for example, via a communication network (e.g., the Internet).

Device 100 is intended to represent a computer system capable of carrying out the teachings of various embodiments of the disclosed embodiments. Device 100 is only one example of a suitable system and is not intended to suggest any limitation as to the scope of use or functionality of embodiments of the invention described herein. Regardless, computing device 100 is capable of being implemented and/or performing any of the functionality set forth herein.

Computing device 100 is operational with numerous other general purpose or special purpose computing system environments or configurations. Examples of well-known computing systems, environments, and/or configurations that may be suitable for use with computing device 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 100 may be described in the general context of computer system-executable instructions, such as program modules, being executed by a computer system. Generally, program modules may include routines, programs, objects, components, logic, data structures, and so on that perform particular tasks or implement particular abstract data types. Computing device 100 may be practiced in distributed data processing environments where tasks are performed by remote processing devices that are linked through a communications network. In a distributed data processing environment, program modules may be located in both local and remote computer system storage media including memory storage devices.

The components of network computing device 100 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 100 typically includes a variety of computer system readable media. Such media may be any available media that is accessible by device 100, and it includes both volatile and non-volatile media, removable and non-removable media.

System memory 128 can include computer system readable media in the form of volatile memory, such as random access memory (RAM) 130 and/or cache memory 132. Computing device 100 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the disclosed embodiments.

Program/utility 140, having a set (at least one) of program modules 115, such as underwriting module, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 115 generally carry out the functions and/or methodologies of embodiments of the disclosed embodiments as described herein.

Device 100 may also communicate with one or more external devices 114 such as a keyboard, a pointing device, a display 124, etc.; one or more devices that enable a user to interact with computing device 100; and/or any devices (e.g., network card, modem, etc.) that enable computing device 100 to communicate with one or more other computing devices. Such communication can occur via Input/Output (I/O) interfaces 122. Still yet, device 100 can communicate with one or more networks such as a local area network (LAN), a general wide area network (WAN), and/or a public network (e.g., the Internet) via network adapter 120. As depicted, network adapter 120 communicates with the other components of computing device 100 via bus 118. It should be understood that although not shown, other hardware and/or software components could be used in conjunction with device 100. Examples, include, but are not limited to: microcode, device drivers, redundant processing units, external disk drive arrays, RAID systems, tape drives, and data archival storage systems, etc.

FIG. 1 is intended to provide a brief, general description of an illustrative and/or suitable exemplary environment in which embodiments of the below described disclosed embodiments may be implemented. As such, FIG. 1 is exemplary of a suitable environment and is not intended to suggest any limitation as to the structure, scope of use, or functionality of an embodiment of the present disclosed embodiments. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Figure 2:
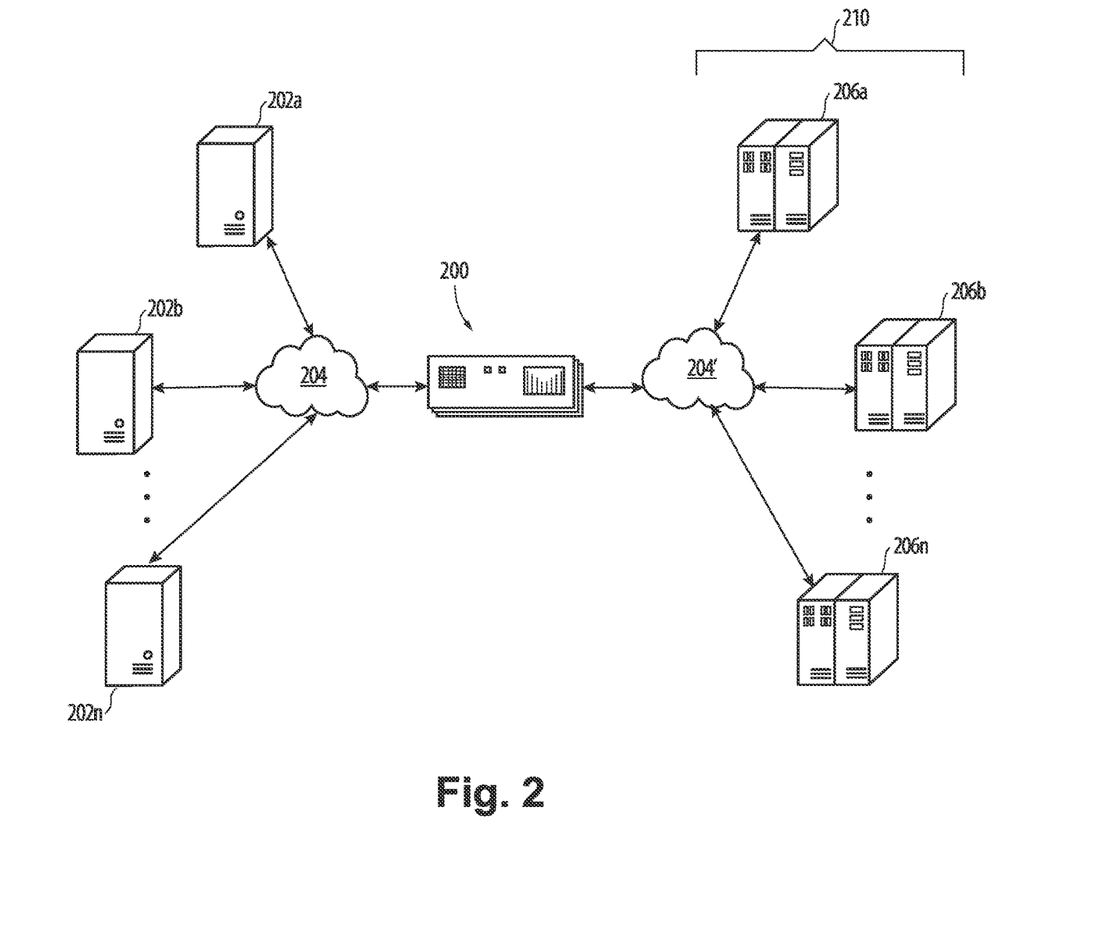
FIG. 2 illustrates an exemplary communication bridged network.

With the exemplary computing system environment 100 of FIG. 1 being generally shown and discussed above, to gain an appreciation of the disclosed embodiments described further below, reference is now made to FIG. 2 illustrating an exemplary network bridge 200, which also may be referred to as an interface unit 200 or gateway 200, shown coupled between the exemplary networks 204 and 204'. In some embodiments, the bridge 200 may be located on network 204. In other embodiments, the bridge 200 may be located on network 204'. In yet another embodiment, a plurality of bridges 200 may be deployed on network 204. In some embodiments, a plurality of bridges 200 may be deployed on network 204'. One or more bridges 200 may be located at any point in the network or network communications path between a client 202 and a server 206. As understood by one skilled in the art, a network bridge appliance (e.g., 200) enables the connection of two or more network segments allowing devices to join a network when it's not possible to connect them directly to a router or switch. For instance, once devices connect using a network bridge appliance, they will appear as if they were physically connected to the router. Essentially, a network bridge is a computer networking device that creates a single, aggregate network from multiple communication networks or network segments. This function is called network bridging, which is distinct from routing. In the OSI model, bridging is performed in the data link layer (layer 2).

In a below disclosed embodiment, a network bridge (300, FIG. 3) is shown coupled to an optional load balancer devices (310, FIG. 3). As also understood by one skilled in the art, a load balancer (310) is a device that generally acts as a reverse proxy and distributes network or application traffic across a number of servers. Load balancers are typically used to increase capacity (concurrent users) and reliability of applications. For instance, the Network Load Balancing (NLB) feature distributes traffic across several servers by using the TCP/IP networking protocol. By combining two or more computers that are running applications into a single virtual cluster, NLB provides reliability and performance for web servers and other mission-critical servers.

With continuing reference to FIG. 2, the system may include multiple, logically-grouped servers 206. In these embodiments, the logical group of servers may be referred to as a server farm 210. In some of these embodiments, the serves 206 may be geographically dispersed. In some cases, a farm 210 may be administered as a single entity. In other embodiments, the server farm 210 comprises a plurality of server farms 210. In one embodiment, the server farm executes one or more applications on behalf of one or more geographically distributed client devices 202. Servers 106 are often referred to as a file server, application server, web server, proxy server, or gateway server. In some embodiments, a server 206 may have the capacity to function as either an application server or as a master application server. In one embodiment, a server 206 may include an Active Directory.

The client devices 202 may also be referred to as client nodes or endpoints. In some embodiments, a client device 202 has the capacity to function as both a client node seeking access to applications on a server and as an application server providing access to hosted applications for other clients 202a-202n.

Figure 3:
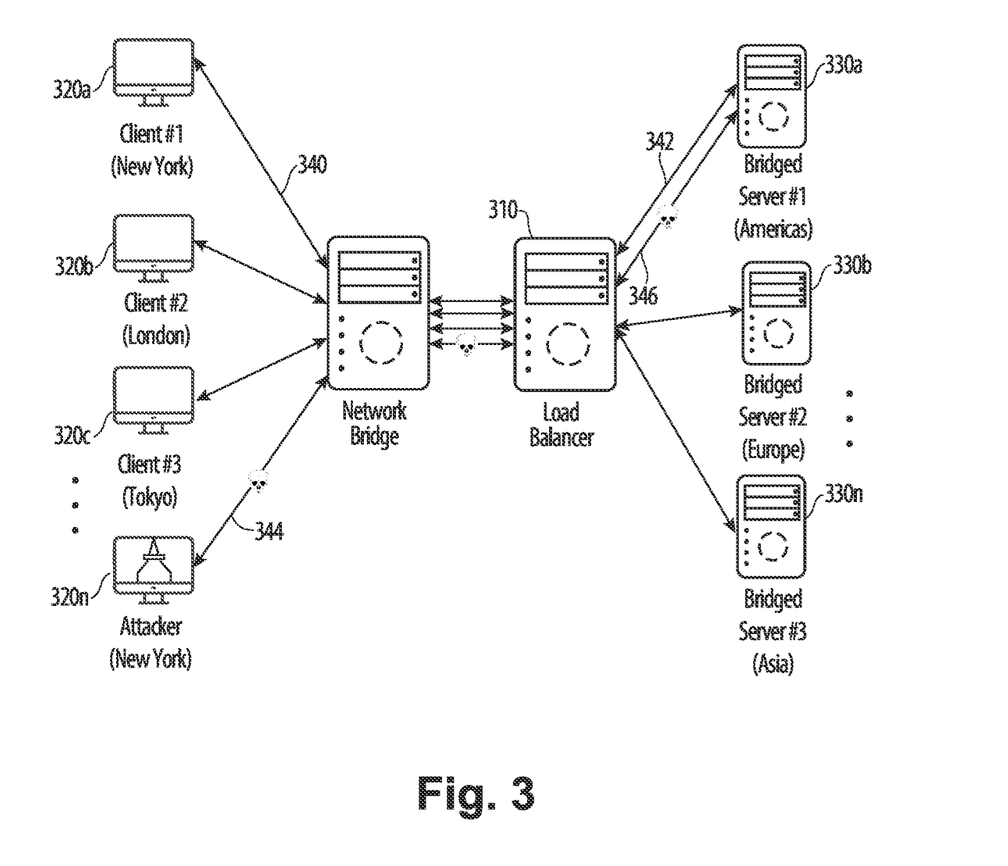
FIG. 3 illustrates an exemplary communication bridged network in accordance with a preferred embodiment.

With above FIGS. 1 and 2 being described above for background understanding of network bridge connections, reference is now made to FIG. 3 which illustrates a preferred illustrated embodiment of a network bridge 300 coupled to a network load balancer 310. It is to be understood the inclusion of load balancer 310 is optional, as mentioned above. The network bridge 300 preferably couples (via a network) to a plurality of geographically distributed client devices 320a-320n, and the network load balancer preferably couples (via a network) to a plurality of geographically distributed server devices 320a-320n. In accordance with the illustrated embodiments, it is to be understood computer networks, bridges (e.g., 300) and proxies are utilized to inspect and/or analyze traffic by upstream services (e.g., by server devices 330a-330n) non-trivial by masking the originating host. For instance, two examples include the identification of original source IP address of a client device 320 for load-balancing and fingerprinting of traffic received therefrom for network security purposes (e.g., mitigating network attacks, such as Distributed Denial of Services (DDoS)). It is to be appreciated that network headers in traffic received from an upstream connection from a client 320 typically include TCP Option 28, HTTP X-Forwarded-For (XFF), and SMTP X-Originating-IP, which are utilized by the load balancer 300 to determine the originating source location of a client device 320a-320n, as well as being modified to expose fingerprints of the client device 320a-320n.

It is to be understood a TCP Option 28 is limited to identifying a single IP address, which leads to complexities for determining a client 320 location if a next hop overwrites it or does not forward it correctly. However, with regards to XFR, it does not share this limitation of TCP Option 28, but it may be rendered useless by encrypted traffic without performing complex decryption operations (assuming decryption is even possible). Thus, neither TCP Option 28 nor XFR allow for multiple sources per packet, adding to network congestion. An additional drawback associated with both TCP Option 28 and XFR is that each is susceptible to spoofing at varying degrees and thus requires distinct implementations and additional processing for upstream services to take advantage of them.

In view of these noted drawbacks associated with TCP Option 28 and XFR, the network bridge 300 in the illustrated embodiment of FIG. 3 is configured and operational to dynamically allocate a pool of persistent upstream connections for use by the network bridge 300. As shown in FIG. 3, network bridge is preferably operable coupled to a connection pool database 600. As readily understood by one skilled in the art, in connection pooling, after a network connection is created, it is placed in a pool (e.g., database of pooled connections 600) and it is used again so that a new connection does not have to be established so as to mitigate the amount of time a user must wait to establish a connection to a server.

In accordance with the illustrated embodiments, when a new downstream connection arrives from a client 320 at the network bridge 300, the network bridge analyzes this downstream connection to determine if it is problematic (e.g., contains a network attack). Any downstream sources (client devices 320a-320n) that are deemed problematic by the network bridge 300 through analysis are kept separate from a connection pool to ensure they do not have negative effects on the pooled connections. It is to be understood that downstream connections that were not deemed problematic by the network bridge 300 will utilize an upstream connection retrieved from the pool. It is to be appreciate that the pool is keyed in such a way that upstream network connections retrieved from the pool will be approximate the downstream connection for a set of network metrics. For instance, examples of such network metrics include the geographical location of the original source client device 320, Transport Layer Security (TLS) client configuration, Quality of Service (QoS) identifiers associated with the downstream connection from the source client device 320, and the like.

As described further below with reference to the flowcharts of FIGS. 4 and 5, in the event there is no upstream pooled connection which approximates the downstream connection from the client device 320 in the connection pool database (e.g., 600), a new upstream network connection is then created for use that preferably utilizes the aforesaid downstream connection as a template. For example, a new upstream connection preferably utilizes the original source IP address, HTTP user-agent, TLS version, TLS cipher suites, etc., associated with the downstream connection from the client device 320.

It is to be appreciated the network bridge 300 is further configured and operable such that, when permissible, network metrics which provide a greater level of accuracy than that of the aforementioned approximation, such as TCP Option 28, are applied to the upstream connection preferably to a server device 330. It is to be additionally appreciated that in accordance with the illustrated embodiments, when an upstream network connection is no longer in use, it is placed back in the connection pool for future reuse. Additionally, in accordance with the preferred illustrative embodiments, preferably for a pre-configured period of time, keep-alive messages are sent periodically to ensure pooled upstream connections are not closed immediately after use by maintaining their viability for a predetermined amount of time (e.g., 1-3 mins), after which stale upstream connections are closed so as to ensure only recently used connections remain open.

With continued reference to illustrated embodiment of FIG. 3 as described above, a preferred method of its operation for providing network bridge connections by a network device using proxied network metrics will now be described with reference to the flowcharts of FIGS. 4 and 5. It is noted that the order of steps shown in FIGS. 4 and 5 are not required, so in principle, the various steps may be performed out of the illustrated order. Also certain steps may be skipped, different steps may be added or substituted, or selected steps or groups of steps may be performed in a separate application following the embodiments described herein.

Figure 4:
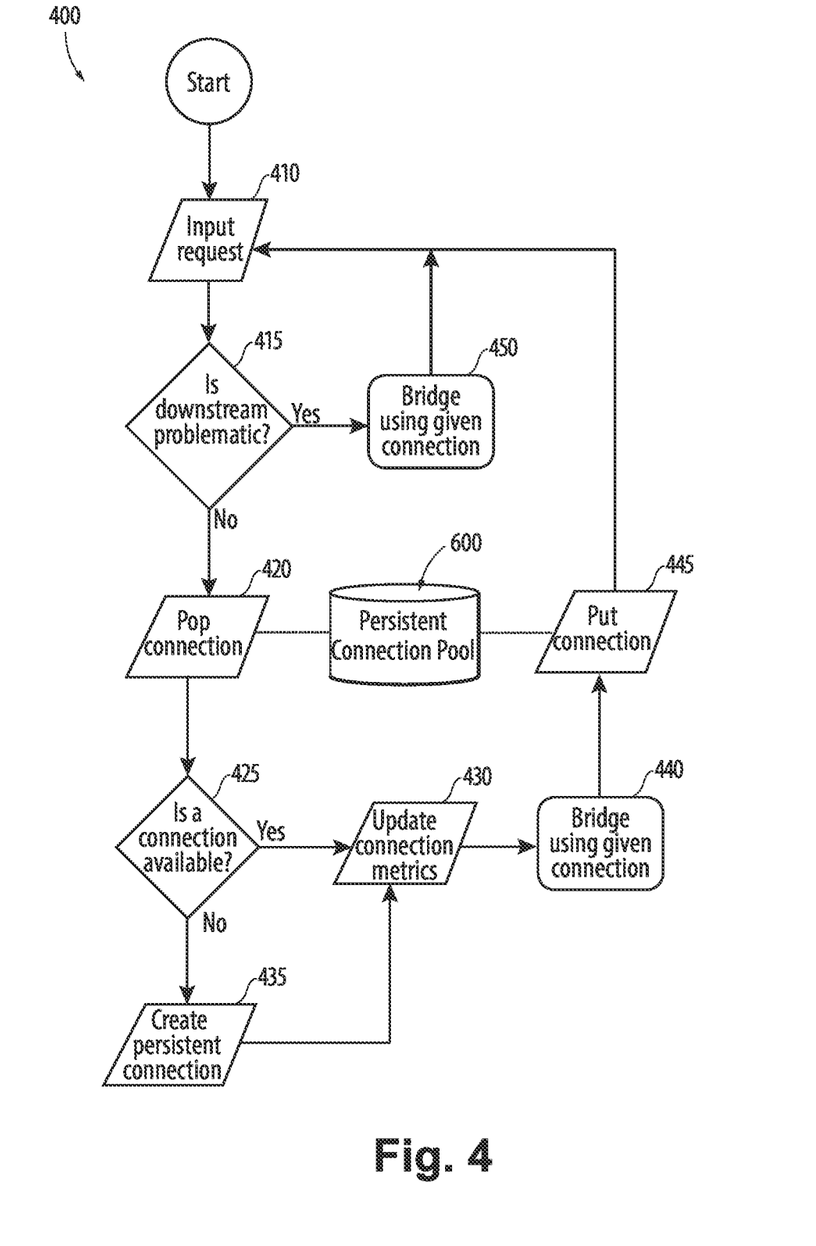
FIGS. 4 and 5 illustrate a method of operation for the communication bridge network of FIG. 3.

Starting with process 400 of FIG. 4, received in a network device 300 is an upstream network connection request (e.g., 340) from a source network device 320 to a destination network device 330, step 410. In accordance with a preferred illustrated embodiment, the network device 300 is to be understood to encompass (but are not to be understood to be limited to): a network bridge device 300 coupled to a network load balancing device 310, with the source network device 320 preferably being a geographically distributed client device 320a-320n, and with the destination network device 330 preferably being a geographically distributed server device 330a-330n.

Next, at step 415, the network bridge 300 preferably analyzes the network bridge downstream connection request (e.g., 340) from a client device (e.g., 320a) to determine if a network attack threat is associated with the requesting client device (e.g., 320a). In accordance with the illustrated embodiment, the network bridge 300 accomplishes this by analyzing certain proxied network metrics associated with the network bridge request (e.g., 340), which preferably includes (but is not limited to) TCP Option 28, HTTP X-Forwarded-For (XFF), and SMTP X-Originating-IP.

In the event the network bridge connection request (e.g., 340) from a client device (e.g., 320a) is determined not to present a network attack threat (step 415), then at step 425 a determination is made by the network bridge 300 if a preexisting network bridge connection between the network bridge device (e.g., 300) and the requested server device (e.g., 330a) exists preferably in a connection pool database 600. If yes, the preexisting upstream connection request to the requested server device (e.g., 330a) is retrieved from the persistent network connection pool 600 (e.g., upstream connection 342) having a plurality of pooled network bridge connections, step 420. In accordance with the illustrated embodiment, retrieving a preexisting upstream network bridge connection (e.g., 342) from the pool database 600 preferably includes retrieving a network bridge connection that approximates a downstream network connection (e.g., 340) based upon certain proxied network metrics associated with the downstream network bridge connection request (e.g., 340). For instance, the certain proxied network metrics may include one or more of: geographical location, Transport Layer Security (TLS) configuration and Quality of Service (QoS) identifiers associated with the network bridge connection source (e.g., client device 320a).

And if it is determined (step 425) that no preexisting network bridge connection between the requesting client device (e.g., 340) and the requested server device (e.g., 330a) exists in the connection pool database 600, then a new network bridge connection (e.g., 342) between the network bridge device (e.g., 300) and the requested server device (e.g., 330a) is created, step 435. Next, at step 430 the network metrics for the upstream bridge connection (e.g., 342) between the requesting client device (e.g., 340) and the requested server device (e.g., 330a) are updated for both preexisting upstream connections retrieved from the connection pool 600 (step 420) and as well as newly created upstream connections (step 435). In accordance with the preferred illustrated embodiment, updating the upstream network bridge connection (e.g., 342) (step 430) includes setting TCP option 28 and/or HTTP header X-Forwarded-For (XFF) and/or SMTP header X-Originating-IP associated with pool member servers. Next, step 440, the updated upstream bridge connection between the requesting client device (e.g., 340) and the requested server device (e.g., 330a) is implemented in a communication network, as shown in the exemplary network of FIG. 3. Once implemented the aforesaid updated upstream bridge connection (e.g., 342) is then placed back in the connection pool database 600 for subsequent retrial for future upstream connection requests (preferably for a predetermined time period, as discussed further below) that are likewise determined, preferably by the network bridge 300, to not present a network attack threat to a requested sever device (e.g., 330a) (step 415).

Returning now to step 415, if the network bridge 300 determines the client device (e.g., 320n) requesting an upstream network connection to a server device (e.g., 330a) does present a network threat (e.g., spoofing, DDoS, etc.), preferably via analysis of the certain proxied network metrics associated with the downstream network bridge connection (e.g., 344), which preferably includes (but is not limited to) TCP Option 28, HTTP X-Forwarded-For (XFF), and SMTP X-Originating-IP, then a new upstream network connection (e.g., 346) is created and implemented for connecting the requesting client device (e.g., 320n) with the requested server (e.g., 330a). It is to be appreciate this upstream network connection (e.g., 346) is separate from any of the pooled upstream connections (e.g., 342) preexisting in the connection pool database 600. An advantage is data from potential network attacking devices (e.g., 320n) is segregated from data sent from devices (e.g., 320a) determined not to present a network attack threat, whereby the data transmitted on the segregated upstream connection (e.g., 346) can be subject to network attack mitigation techniques (such as data rate limiting, blacklisting, and the like).

Figure 5:
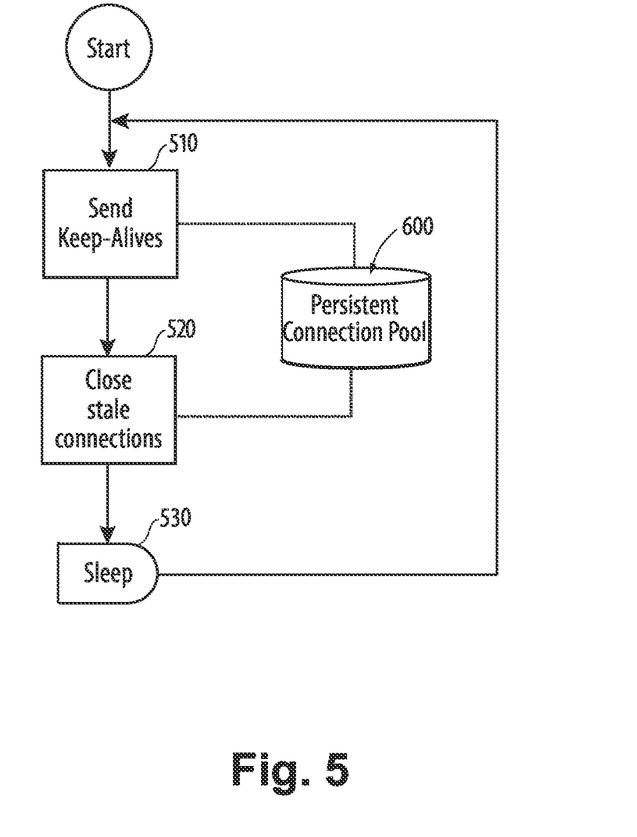

With reference now to process 500 of FIG. 5, preexisting network bridge connections (e.g., 342), that have been not been implemented within a predetermined time period, are preferably maintained in the persistent bridge network connection pool database 600 preferably by providing keep alive signals to the connection pool database for such preexisting upstream network connections (e.g., 342). After a predetermined period of time has expired for an unused upstream network connection (e.g., 1-3 mins), then that unused upstream network connection is preferably removed from the persistent bridge network connection pool database 600 (e.g., it is stale). This process is thereafter repeated for all upstream connections present in the connection pool database, preferably in a loop process, via step 530.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method for providing network bridge connections by a network device using proxied network metrics, comprising:

receiving, in the network device, a network bridge connection request from a first network component to a second network component;

analyzing the network bridge connection request to determine if a network attack threat is associated with the first network component;

if no network attack threat is determined based on the determining, then:
  determine if a preexisting network bridge connection between the first and second network components exists in a database associated with the network device;
  retrieve from the database and implement the preexisting network bridge connection between the first and second network components if it is determined a preexisting network bridge connection exists;
  generate and implement a new network bridge connection between the first and second network components if it is determined a preexisting network bridge connection did not exist; and
  update and store in the database the implemented network bridge connection for subsequent retrieval for future network bridge connection requests.

2. The method for providing network bridge connections as recited in claim 1, further including generating and implementing a network bridge connection between the first and second network components that is separate from any preexisting network bridge connections if it is determined a network attack threat is associated with the network bridge connection request.

3. The method for providing network bridge connections as recited in claim 2, wherein the first network component is network client device.

4. The method for providing network bridge connections as recited in claim 3, wherein the second network component is a network server device.

5. The method for providing network bridge connections as recited in claim 4, wherein the network device is a network bridge device.

6. The method for providing network bridge connections as recited in claim 5, wherein the network bridge device is coupled to a network load balancer device.

7. The method for providing network bridge connections as recited in claim 5, wherein analyzing the network bridge connection request includes analyzing proxied network metrics associated with the network bridge connection request.

8. The method for providing network bridge connections as recited in claim 7, wherein the preexisting network bridge connection is retrieved from a persistent bridge network connection database having a plurality of pooled network bridge connections.

9. The method for providing network bridge connections as recited in claim 8, wherein retrieving a preexisting network bridge connection from the database includes retrieving network bridge connections from the database that approximate a downstream network connection based upon certain proxied network metrics associated with the network bridge connection request.

10. The method for providing network bridge connections as recited in claim 9, wherein the certain proxied network metrics include one or more of: geographical location, Transport Layer Security (TLS) configuration and Quality of Service (QoS) identifiers associated with the network bridge connection source associated with the first network component.

11. The method for providing network bridge connections as recited in claim 8, wherein updating the network bridge connection includes setting TCP option 28 and/or HTTP header X-Forwarded-For (XFF) and/or SMTP header X-Originating-IP associated with pool member servers.

12. The method for providing network bridge connections as recited in claim 8, further including maintaining preexisting network bridge connections in the persistent bridge network connection pool database that have been not been implemented within a predetermined time period.

13. The method for providing network bridge connections as recited in claim 12, further including removing preexisting network bridge connections from the persistent bridge network connection pool database that have been not been implemented after expiration of the predetermined time period.

14. A network bridge device for providing network bridge connections using proxied network metrics, comprising:
  one or more data bases having memory configured to store instructions;
  a processor disposed in communication with said memory, wherein the processor upon execution of the instructions is configured to:
  receive a network bridge connection request from a first network component to a second network component;
  analyze the network bridge connection request to determine if a network attack threat is associated with the first network component;
  if no network attack threat is determined based on the determining, then:
  determine if a preexisting network bridge connection between the first and second network components exists in a database associated with the network device;
  retrieve from the database and implement the preexisting network bridge connection between the first and second network components if it is determined a preexisting network bridge connection exists;
  generate and implement a new network bridge connection between the first and second network components if it is determined a preexisting network bridge connection did not exist; and
  update and store in the database the implemented network bridge connection for subsequent retrieval for future network bridge connection requests.

15. The network bridge device as recited in claim 14, wherein the processor is further configured to generate and implement a network bridge connection between the first and second network components that is separate from any preexisting network bridge connections if it is determined a network attack threat is associated with the network bridge connection request.

16. The network bridge device as recited in claim 14, wherein the network bridge device is coupled to a network load balancer device.

17. The network bridge device as recited in claim 15, wherein analyzing the network bridge connection request includes analyzing proxied network metrics associated with the network bridge connection request.

18. The network bridge device as recited in claim 15, wherein the preexisting network bridge connection is retrieved from a persistent bridge network connection database having a plurality of pooled network bridge connections.

19. The network bridge device as recited in claim 18, wherein retrieving a preexisting network bridge connection from the database includes retrieving network bridge connections from the database that approximate a downstream network connection based upon certain proxied network metrics associated with the network bridge connection request.

20. The network bridge device as recited in claim 19, wherein the processor is further configured to:

maintain preexisting network bridge connections in the persistent bridge network connection pool database that have been not been implemented within a predetermined time period; and remove preexisting network bridge connections from the persistent bridge network connection pool database that have been not been implemented after expiration of the predetermined time period.

\* \* \* \* \*